Figure 3:
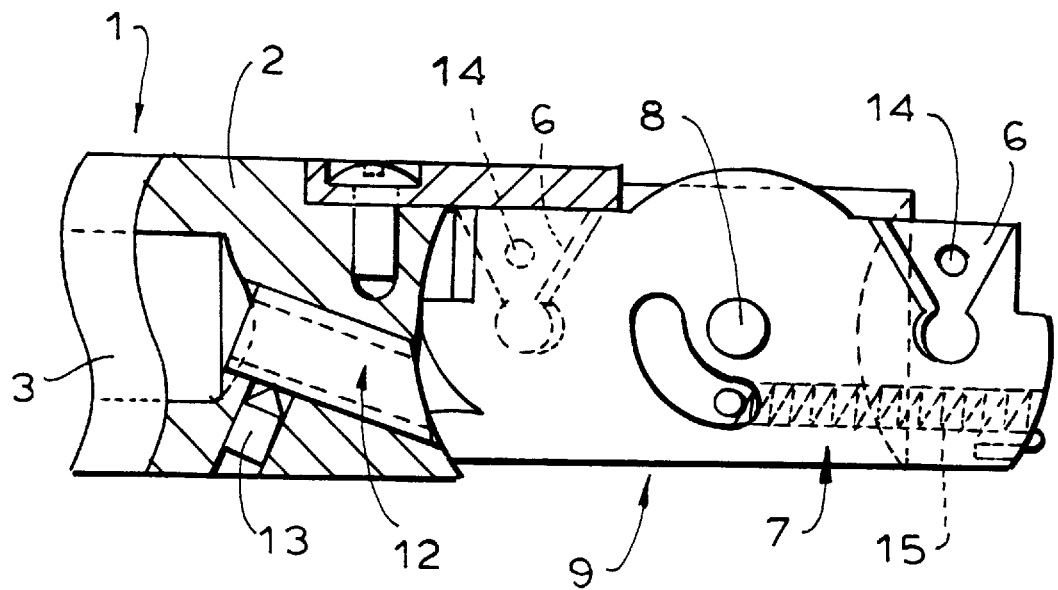

United States Patent
Nordstrom

[11] Patent Number: 5,829,925
[45] Date of Patent: Nov. 3, 1998

[54] COOLANT ACTUATED REAR-END COUNTERSINKING TOOL

[75] Inventor: Anders Nordstrom, Uddevalla, Sweden

[73] Assignee: H. Granlund Tools KB, Eskilstuna, Sweden

[21] Appl. No.: 793,382
[22] PCT Filed: Aug. 23, 1994
[86] PCT No.: PCT/SE94/00765
 § 371 Date: Feb. 21, 1997
 § 102(e) Date: Feb. 21, 1997
[87] PCT Pub. No.: WO96/05928
 PCT Pub. Date: Feb. 29, 1996
[51] Int. Cl.⁶ ................................................ B23B 51/10
[52] U.S. Cl. ........................... 408/57; 408/147; 408/187
[58] Field of Search ................................ 408/56, 57, 60, 408/54, 93, 147, 154, 187, 188, 159

[56] References Cited

U.S. PATENT DOCUMENTS

| | | | |
|---|---|---|---|
| 2,394,612 | 2/1946 | Horne, Jr. | 408/187 |
| 3,320,831 | 5/1967 | Bullard, III | 77/1 |
| 3,540,325 | 11/1970 | Artaud | 408/187 |
| 3,572,182 | 3/1971 | MacDonald | 408/187 |
| 4,475,852 | 10/1984 | Koppelmann | 408/93 |
| 4,716,657 | 1/1988 | Collingwood | 33/561 |
| 4,850,099 | 7/1989 | Scollard | 29/563 |
| 5,135,338 | 8/1992 | Heule | 408/187 |

FOREIGN PATENT DOCUMENTS

| | | | |
|---|---|---|---|
| 263940 | 1/1989 | Denmark . | |
| 650246 | 9/1937 | Germany | 408/187 |
| 234815 | 4/1986 | Germany | 408/147 |
| 255684 | 4/1988 | Germany | 408/57 |
| 93 00616-1 | 8/1994 | Sweden . | |

Primary Examiner—Daniel W. Howell
Attorney, Agent, or Firm—Ostrolenk, Faber, Gerb & Soffen, LLP

[57] ABSTRACT

The invention relates to a backspot facing tool for machining operations. At least one cutting fluid jet is used to actuate a cutter included in the tool, causing it to move from a retracted to a non-retracted position.

6 Claims, 5 Drawing Sheets

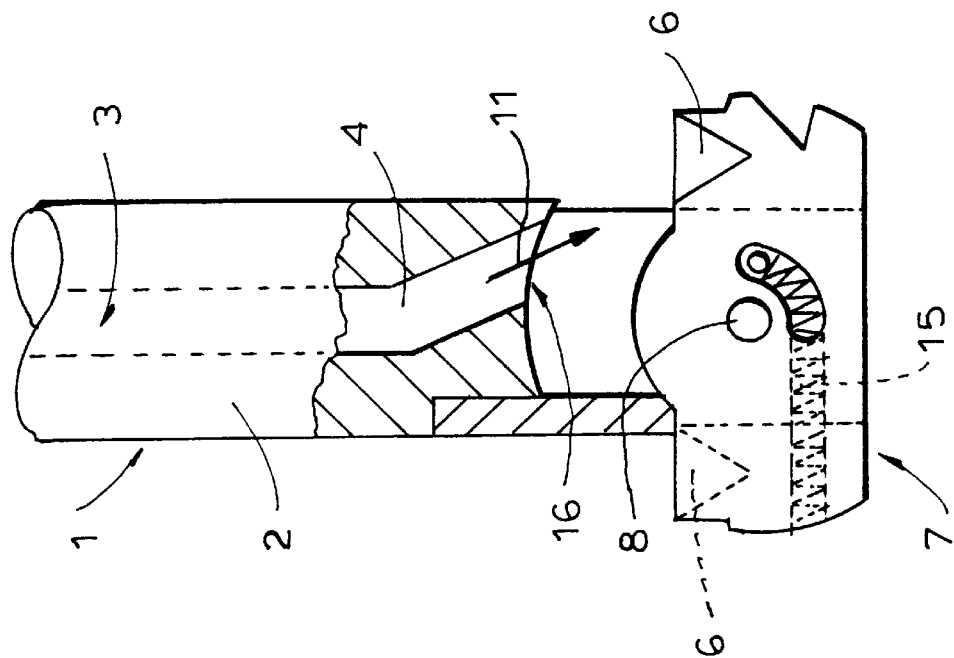
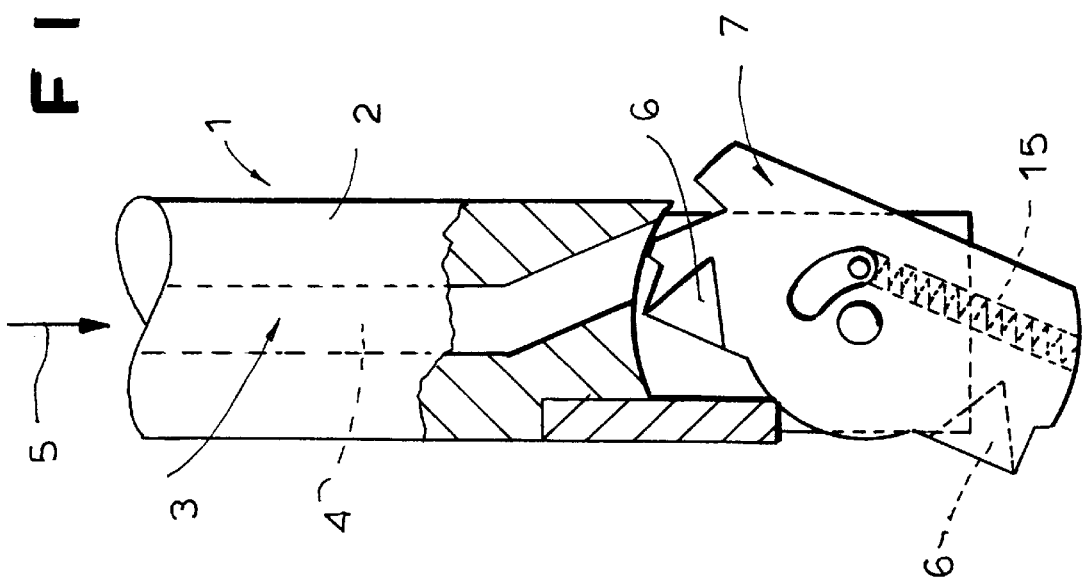

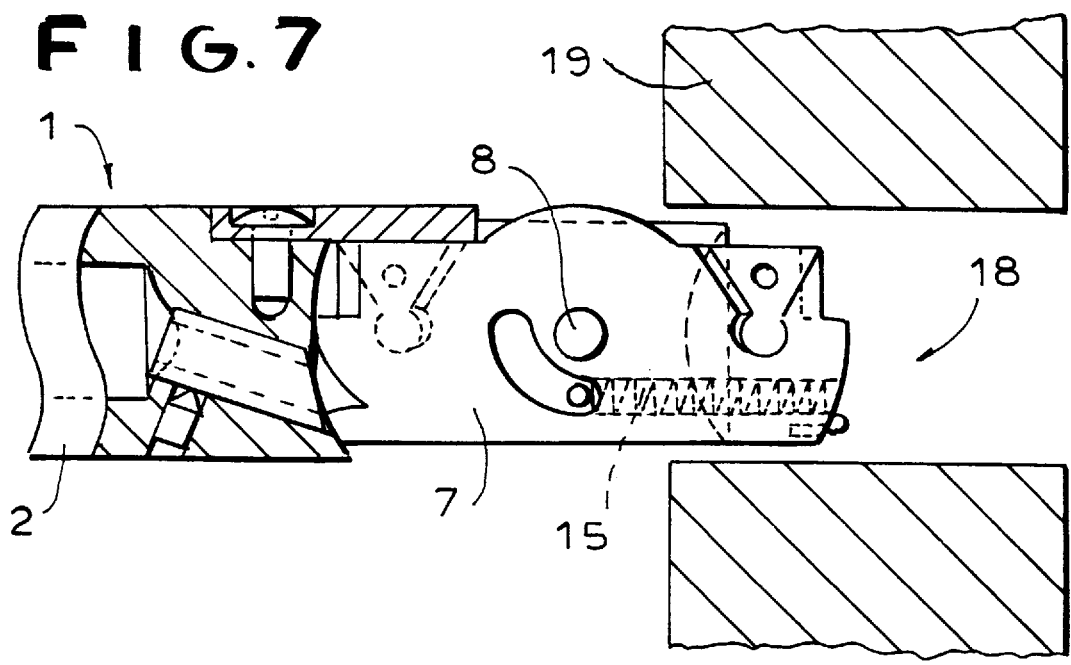
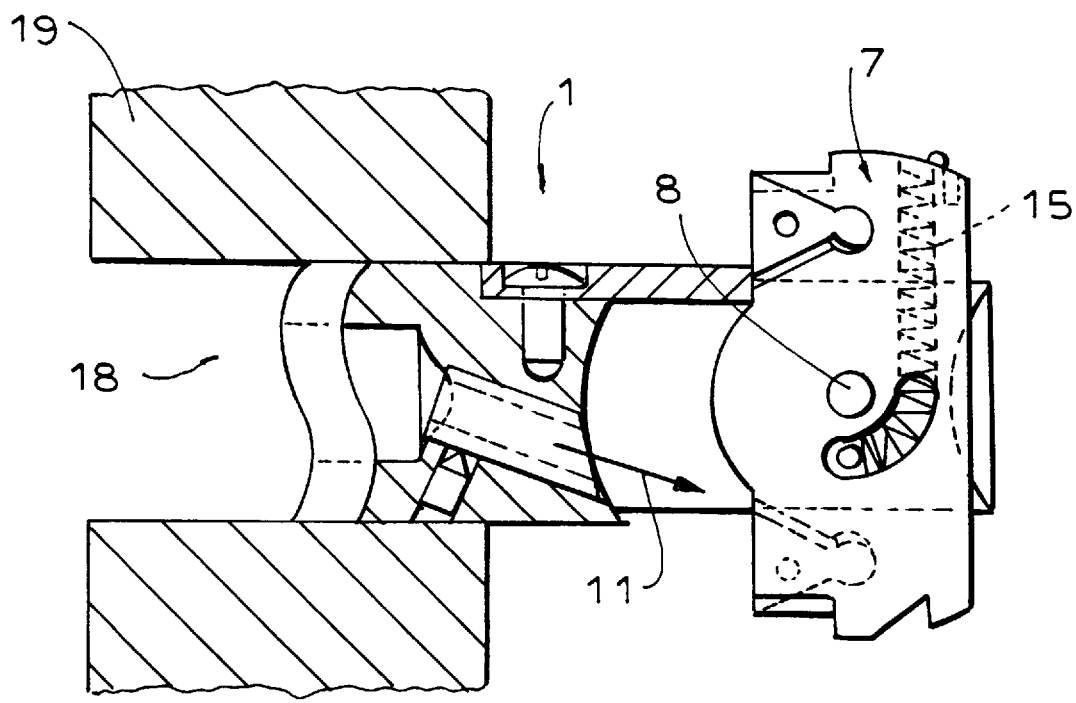

COOLANT ACTUATED REAR-END COUNTERSINKING TOOL

The present invention relates to an arangement in back spot facing tools, i.e. tools intended to perform machining operations in a direction counter to that customary for the machine in question, such a type of work operation being commonly denoted backspot facing.

In machining operations, a situation sometimes occurs where it is desired to perform machining in the return direction of an ordinary working operation such as a boring operation. A common example of this is carrying out back spot facing or the like operations. Machining today is often performed on fully automatic machiningcenters, where availability of a flowing medium or cutting fluid supplies to the workpiece via the machine spindle, is continually improving and consequently there are also provided opportunities for utilising the flowing cutting fluid to actuate or control tool function.

At present there are tools where the cutting fluid is utilized via small, built-in cylinders and linkages to control tool function, and machine capacity with respect to pressure and flow of cutting fluid is also becoming better and better, sometimes up around 100 bar for good flows. There accordingly arises the possibility of controlling a tool in ways other than the one just mentioned, more specifically by utilizing the effect of the force of a jet emitted by a suitable nozzle, this jet then being caused to actuate or control tool function, which results in many advantages.

The object of the present invention is to achieve an arrangement in a tool of the kind mentioned in the introduction, which has improved performance and greater durability than previously known devices, as well as being simple to manufacture. The distinguishing features of the invention are disclosed in the accompanying claims.

As a result of the invention there has been achieved an arrangement for a tool, the function of which may be controlled with the aid of the force in a jet of cutting fluid. The use of this working principle results in that manufacturing the tool may take place using relatively few component parts, which in turn provides stability and good durability. In addition, there is obtained a self-cleansing effect by the cutting fluid. In the case where the inventive arrangement is adapted for application to numerically controlled machiningcenters, the supply of cutting fluid will be extremely good as it flows through the tool to the cutting site.

Figure 5:
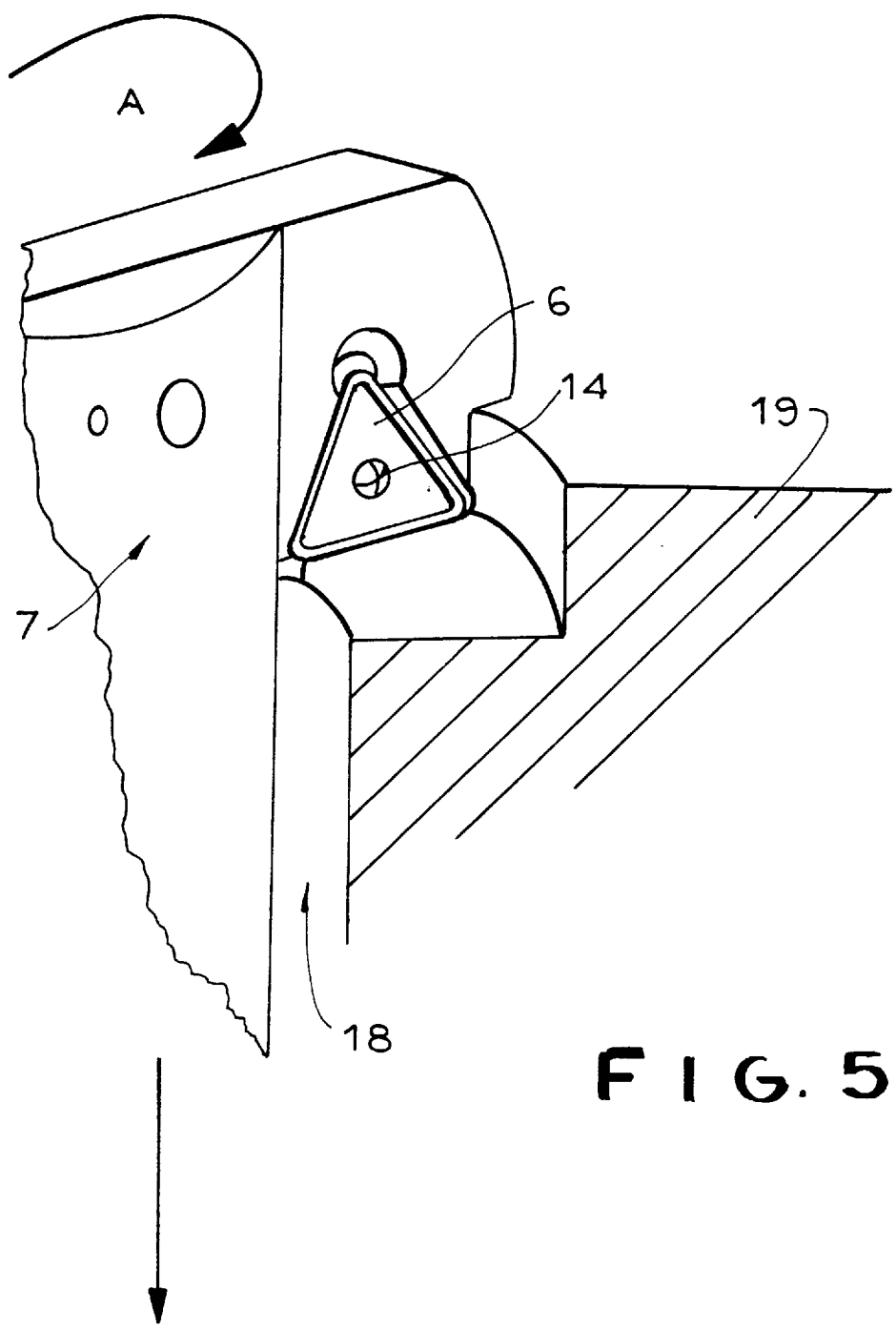
Figure 6:
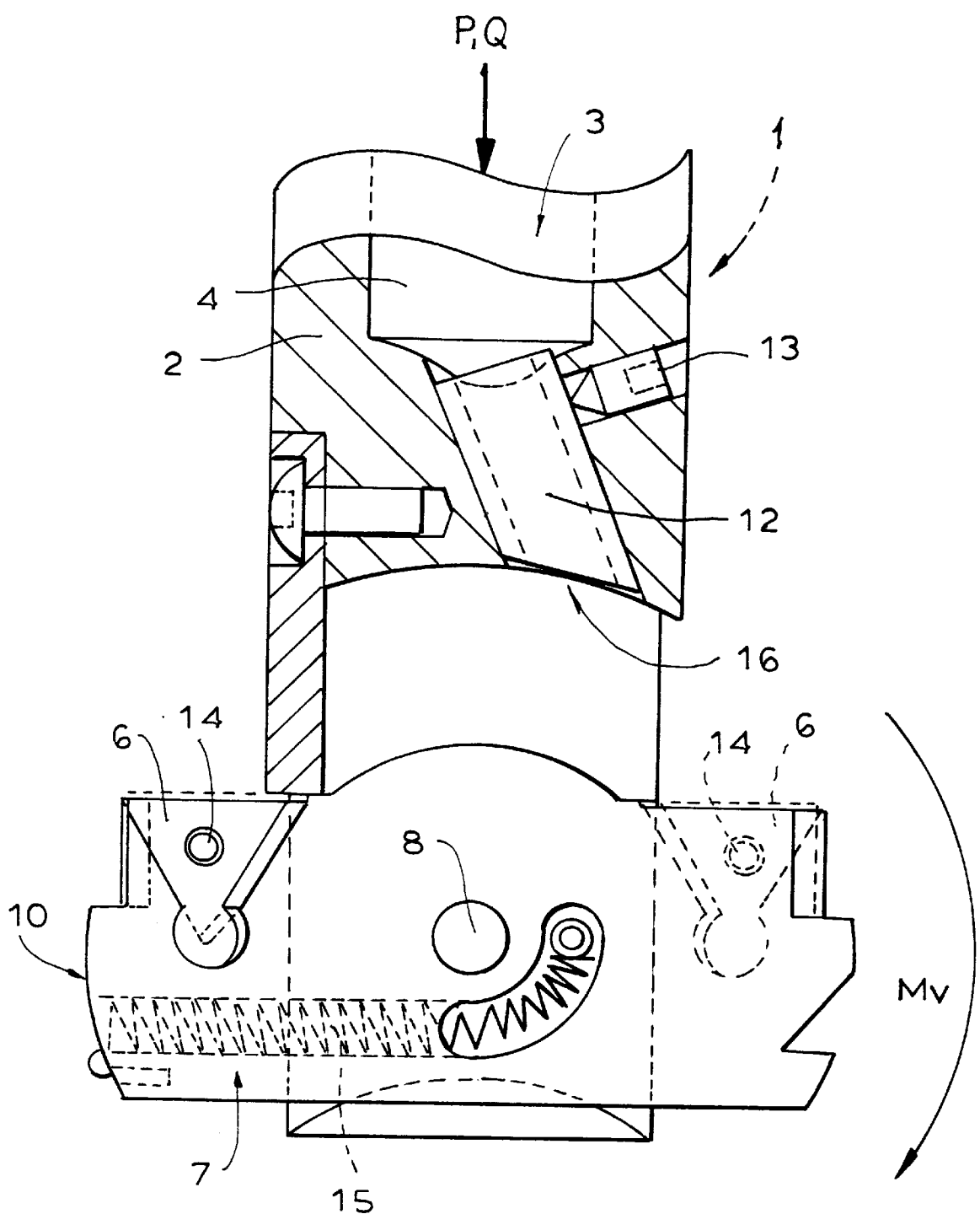

The invention will now be described more in detail, with the aid of a preferred embodiment and with reference to the accompanying drawings, where:

FIG. 1 is a schematic side elevation, partly in cross section, of a tool in accordance with the invention. The cutter holder part of the tool is shown in its opening phase while being opened out from its retracted position along the tool shank, FIG. 2 illustrates the tool of FIG. 1 when the holder part is fully opened out with the cutter in its working position, FIG. 3 illustrates the tool to an enlarged scale and in partial section, such as to show how the exchangeable nozzle for the cutting fluid is placed, the cutter holder part being retracted here, FIG. 4 is the same as FIG. 3, but with the holder part in its opened out position, FIG. 5 is a principle, schematic sketch of the described and illustrated tool according to the embodiment example, where the cutter is in operation, FIG. 6 is an even more enlarged and explicatory side elevation of the inventive subject, and here may be seen the function of a spring used to keep the cutter holder part in its retracted position when cutting fluid supply is terminated, FIG. 7 illustrates how the tool, during its working operation, is taken into an existing hole in a workpiece, the cutter holder part being in its retracted position and FIG. 8 illustrates the tool when its cutter holder part is opened out to its working position with the aid of a cutter fluid jet, thus enabling initiation of machining as illustrated in FIG. 5.

As will be seen from the drawings the tool 1 comprises, in accordance with a preferred embodiment, a cylindrical shank 2, extending through which there is a duct 3 for taking cutting fluid 4 in a flow direction 5 to a cutter holder part 7 for at least one cutter 6. The part 7 is journalled on a shaft 8 such as to pivot from a retracted position 9 in the longitudinal direction of the shank 2 to an opened-out position 10, where it is transverse the longitudinal direction and in its working position. In the preferred embodiment there is utilized a flowing medium to cause the cutters of the tool 1 to assume their working position, more specifically, the force from a jet 11 formed by the cutting fluid 4. This jet causes the cutter holder part 7 to pivot from its retracted position 9 to its opened-out position 10. Return movement of the part 7 is obtained in the illustrated embodiment with the aid of a tension spring 15.

To enable optimising the jet force of the flowing medium, in the case in question the cutting fluid, depending on its characteristics such as pressure and flow, a suitable, exchangeable nozzle is used. FIGS. 3 and 4 clearly show how such a nozzle or jet 12 is fitted to the tool shank 2 at the outlet 16 of the cutting fluid 4 with the aid of a locking screw 13. By selecting a nozzle 12 with an appropriate orifice optimum working force from the jet 11 is obtained, irrespective of the pump characteristic of the machine tool used. Of course, jets with adjustable orifice areas may be used. In the case where the outlet 16 is provided in the recess 17 accommodating the cutter holder part 7, a self cleansing effect is obtained by the cutting fluid for removing swarf, dirt and the like. From FIGS. 3 and 4 it will also be seen how the cutters 6 are fixed on the holder part 7 with the aid of screws 14, and how the tension spring 15 is accommodated in part 7 for retracting this part.

Figure 4:
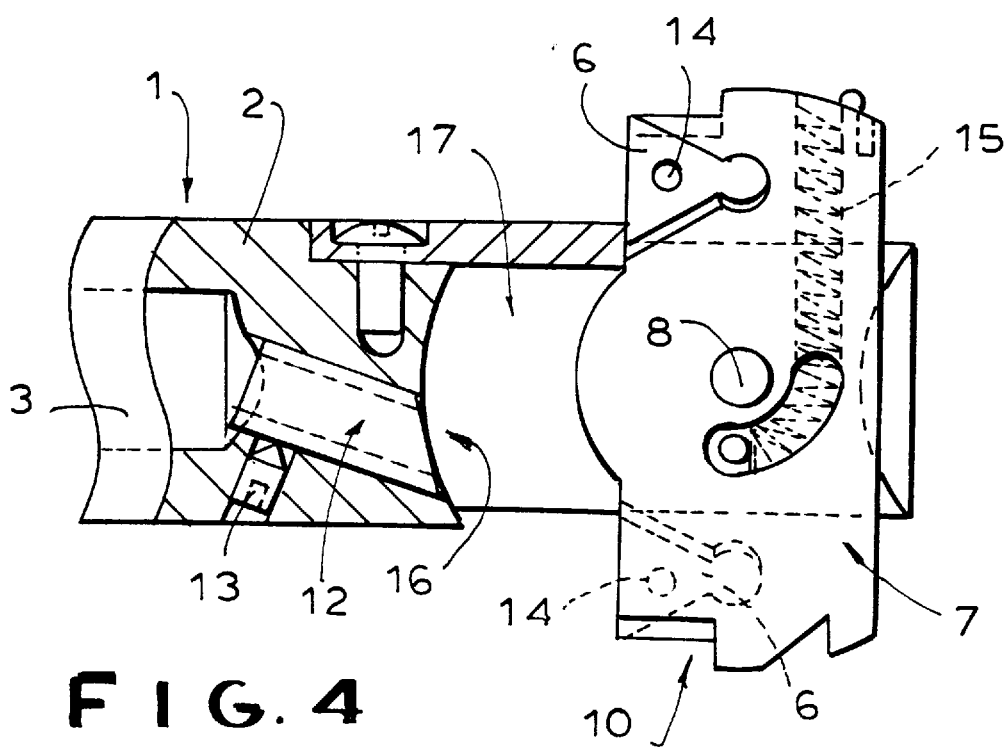

It will be seen from FIGS. 1 and 2 how the cutting liquid 4 is fed in the flow direction 5 in duct 3 provided in the shank 2 of the tool 1 such as to reach at least one nozzle 12 (see FIGS. 3 and 4). From nozzle 12 the jet 11 formed by it is directed such as to impinge on, and actuate the pivotable cutter holder part 7 for causing it to assume its working position. The return movement of holder part 7 is achieved with by means of tension spring 15 when the flow of cutting fluid 4 is cut off.

A principle sketch FIG. 5 illustrates the tool 1, in accordance with the selected embodiment example, with its openedout holder part 7 and cutter 6 in position for machining the orifice of a bore 18 in a workpiece 19. The feed direction for machining is according to arrow B and the rotational direction of the cutters 6 is according to arrow A.

FIG. 6 is an explicatory, partially sectioned elevation to an enlarged scale, showing the holder part 7 with cutters 6 in its opened-out or working position 10. Here will be seen the duct 3 for the cutting fluid 4 at a pressure P and a flow Q, as well as the return spring 15 for keeping holder part 7 in a retracted position when there is no supply of cutting fluid 4. In the preferred embodiment, fluid pressure P may be 34–50 bar for a flow Q of 21–14 l/min. For a pressure of 34 bar and flow 21 l/min a torque moment $M_y$ of 0,23 Nm is applied to the holder part 7.

Two positions in the operational cycle of the tool are respectively illustrated in FIGS. 7 and 8. In FIG. 7 the rotating tool 1 has partly entered the existing bore 18 in the workpiece 19, and as the cycle continues the cutter part 7 emerges from the bore a sufficient distance to allow it to pivot freely, whereon the cutting fluid supply of the NC machine, is turned on, causing, as illustrated in FIG. 8, part 7 to open out and cutters 6 to assume their working position, due to actuation by jet 11. The cycle now continues with the tool moving towards the surface of the workpiece for machining, according to the principle illustrated in FIG. 5, until a desired depth has been reached. The tool is now taken once again to its position in FIG. 8 and fluid supply is closed, whereon the holder part 7 retracts with the aid of the spring 15 and the cycle is completed by withdrawing the tool from the workpiece 19 to its initial position.

I claim:

1. Arrangement in backspot facing tools for machining, characterized in that at least one cutting fluid jet is used to directly cause at least one cutter included in the tool to assume a non-retracted position.

2. Arrangement as claimed in claim 1, characterized in that cutting fluid is taken through at least one duct in the cylindrical shank of the tool for ejection as a fluid jet impinging on a part retaining the cutter and being pivotable from an inoperative, retracted position to a non-retracted or opened-out operative position for machining.

3. Arrangement as claimed in claim 2, characterized in that return movement of the cutter holder part to its retracted position takes place with the aid of means providing a spring force.

4. Arrangement as claimed in claim 3, characterized in that the means providing a spring force is a tension spring.

5. Arrangement as claimed in claim 1 characterized in that the fluid jet may be adjusted to suit the pump characteristic of the machine driving the tool by altering the bore diameter of a nozzle adapted in the orifice of duct for the cutting fluid.

6. Arrangement as claimed in claim 2, characterized in that the fluid jet may be adjusted to suit the pump characteristic of the machine driving the tool by altering the bore diameter of a nozzle adapted in the orifice of duct for the cutting fluid.

* * * * *